April 7, 1953 — C. P. CRAWFORD — 2,633,840
AUXILIARY OVEN
Filed Dec. 10, 1948
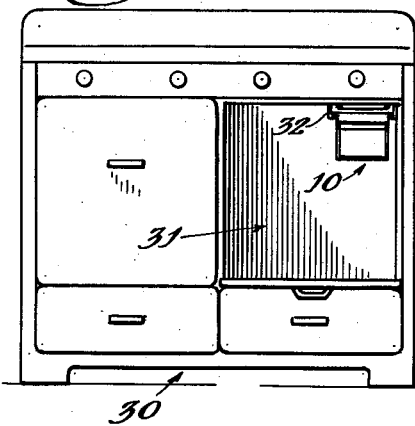
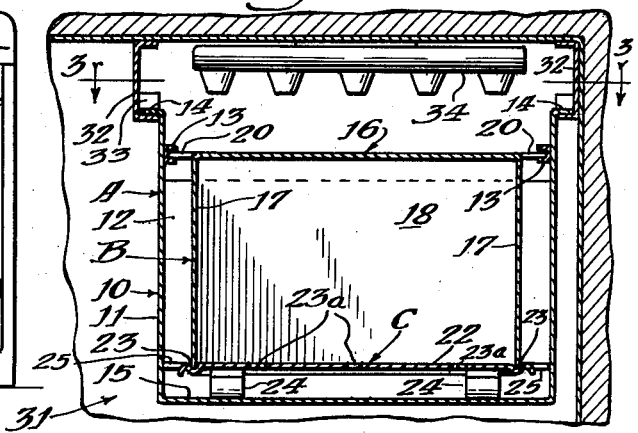
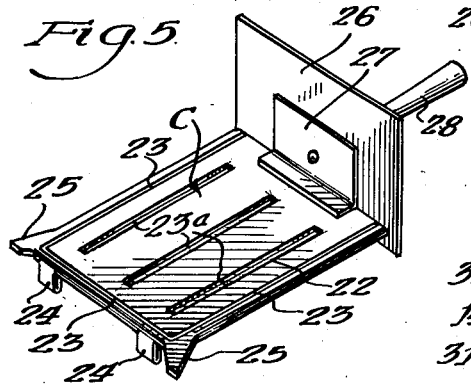
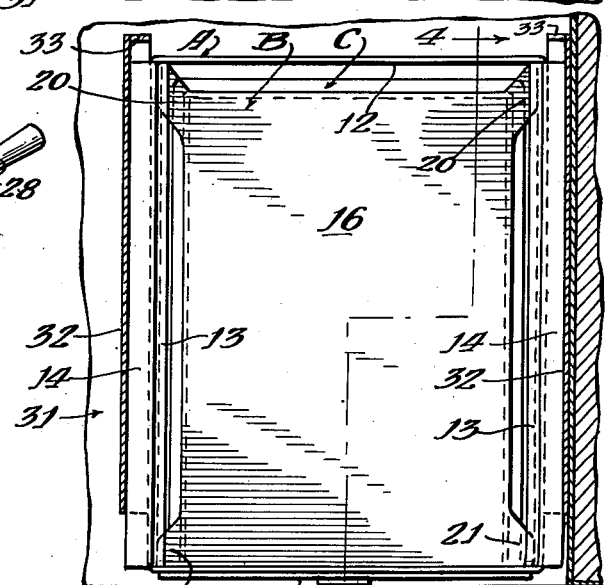
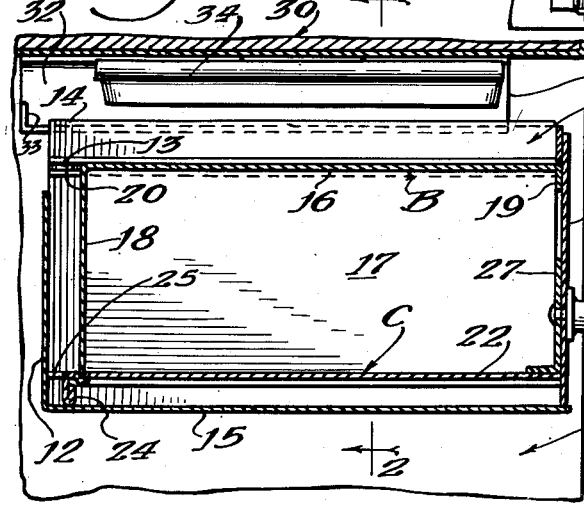
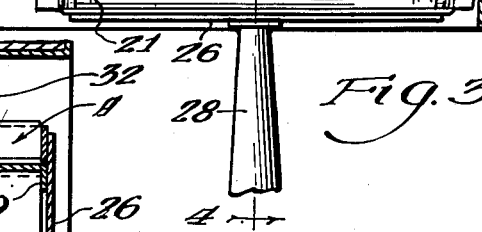
Inventor:
Charles P. Crawford
By Wm. F. Freudenreich, Atty.

Patented Apr. 7, 1953

2,633,840

UNITED STATES PATENT OFFICE 2,633,840

AUXILIARY OVEN

Charles P. Crawford, Chicago, Ill.

Application December 10, 1948, Serial No. 64,529

5 Claims. (Cl. 126—39)

The present invention relates to the art of cooking foods in various forms and methods. The ordinary household gas ranges are designed for the purpose of cooking in one way only with the oven part, particularly one that is equipped with a large burner, whereby it requires the entire oven to be heated to even cook a very small amount of food.

The present invention has for its object a time and money saver, that can be constructed cheaply with no alterations to a large oven.

It is a simple, novel, small, compact and light unit that can be easily inserted or removed from the large oven, and supplies means whereby a large variety of different foods can be cooked by various methods in a satisfactory manner. The oven part in its more highly developed form provides a more perfectly balanced baking operation. Toasted bread and toasted cheese sandwiches or the like can be prepared in this manner and are of a superior quality to similar foods made by old methods and with toasters of the ordinary type.

Viewing my invention as a toaster, broiling and baking unit, it may be said to have for its object the production of toasted bread, toasted cheese sandwiches, broiling steaks, chops and other meats and baking pies, cakes, custards, potatoes or the like of a quality superior to many other methods.

This new device is practical, fool-proof and constructed in a manner to provide means whereby, even a child can use them. This toasting, broiling and baking oven being small and compact, the only cooking gas used is concentrated directly within the unit, therefore providing a great saving of gas. Modern gas ranges require the large burner in the oven to be turned on with all outlets burning even when a small amount of food is being cooked.

The various features of novelty whereby my invention is characterized will be hereinafter pointed out, with particularity in the claims, but, for a full understanding of the invention and its various objects and advantages, reference may be had to the following detailed description taken in connection with the accompanying drawings, wherein:

Figure 1 is a front elevation of a gas range with door open disclosing my invention; Fig. 2 a vertical section taken on line 2—2 of Fig. 4; Fig. 3 section taken on line 3—3 of Fig. 2; Fig. 4 section taken on the line 4—4 of Fig. 3, with the handle left in elevation; Fig. 5 a perspective view of the toasting member.

Referring to the drawings 10 represents my device as a whole; the same being a small auxiliary oven conveniently about eight inches square, made up of units A, B, and C.

Unit A is a casing having side walls 11 and a rear wall 12. The side walls 11 have welded to them channel shaped bars. The side walls 11 have, along their upper edges external flanges 14 integral therewith. The side walls are connected with a bottom wall 15. It is readily understood the rear wall 12 and the bottom plate or wall 15 can be formed in one piece or welded.

The unit B has a top wall 16, side walls 17 and rear wall 18, and the wall 16 has a turned down flange 19 at the front end.

The top wall 16 has projecting members or ears 20 and 21. These members 20 and 21 are slideable in the guide channels 13. Members 20 and 21 are also used as spacers between the side walls of the units A and B.

The unit C is a horizontal plate 22 provided with grooves 23 to receive the lower edges of walls 17 and 18 of unit B so as to make a snug fit, and thereby create a closed baking chamber. The top plate 22 also has apertures or slots 23ª which will permit hot gases to penetrate into the baking chamber from below. The top plate 22 also has integral legs 24, to support it on and in spaced relation to the bottom wall 15 of unit B.

The plate 22 has formed on its back end guide members 25 which also act as spacers between the edges of the plate and walls 11 of unit B.

Fastened to the front end of plate 22 is a vertical plate member 26 acting as the front wall and oven door when unit C is slid into unit A. The member 26 abuts against the front edge of the plate 22 and projects a short distance below the same; being conveniently secured by means of an angular member 27 which can be spot welded to both member 26 and plate 22. A handle 28 is connected to the members 26 and 27 by a screw or bolt.

30 indicates a gas range of any suitable type having the usual oven 31 and supporting channels 32 welded thereto to receive the flanges 14 of unit A.

The supporting channels 32 are preferably at the front and at one side of the oven and need not be longer than the auxiliary oven. Stop members 33, at the rear ends of these channels, prevent the auxiliary oven from being pushed in too far. In the top of the oven, between the channels is a gas burner 34 that may be of the usual type used in ovens.

In operation, units A, B, and C are slid into the cooking stove oven 31 over the supporting channels 32 to form a complete closed chamber. The gas burner is then lit and the hot gases therefrom pass down between the walls 12 and 18 and the side walls 11 and 17 into the space between the bottom walls 15 and 22; finally rising through slots or openings 23ª into the closed little oven member, thus forming a perfectly balanced operation for baking.

When toasting or broiling is desirable the unit B is removed. Then the heat will travel down directly to the face part of plate 22.

Unit A need not be removed from the main oven in order to remove cooked food. Actually, one need only withdraw the unit C by means of its handle, to take the cooked food out; whereas food to be cooked may be placed on unit C which is then slipped into unit A, where unit B may have been left undisturbed. Of course, units B and C may be removed together, unit B forming a cover for the food as long as may be desired.

While I have illustrated and described with particularity only a preferred form of my invention, I do not desire to be limited to the exact details thus illustrated and described; but intend to cover all forms and arrangements that come within the definitions of my invention constituting the appended claims.

I claim:

1. The combination with the oven of a cooking stove, of short, spaced, stationary, parallel hanger bars in the top of the aforesaid oven extending in the front and rear direction, a small auxiliary oven casing open at the upper side and having at the top elements adapted to rest on said bars to permit the casing to be slid into position wherein it is supported by the bars or to be withdrawn from the bars in the forward direction, and a removable closed food container narrower and shorter than said casing positioned in the casing and spaced apart from at least some of the upright walls of the casing, the bottom of the food container being spaced from the bottom of the casing and containing openings in communication with the space between said bottoms.

2. An auxiliary oven comprising an outer member in the form of a casing open at the top and at the front, a horizontal plate moveable into and out of the open front of the lower part of the casing and having at the front end an upright wall to close the open front of the casing, feet on the plate to support it above the bottom of the casing and a cover member to form with the plate and said upright wall a food containing chamber, guides extending from front to rear in the casing, and elements on the cover member cooperating with said guides to provide slidable support for the cover member.

3. An auxiliary oven comprising an outer member in the form of a casing open at the top and front part, a food supporting member slidable into and out of the open front of the outer member and having at the front end an upright wall that closes the open front of the outer member, and a cover member; guide members extending from front to rear on the inner sides of the walls of the casing, said cover member being shorter and narrower than the outer member, comprising a top wall, a rear wall and two side walls, and being open at the front and at the bottom; and narrow projections on said cover member, engaged with said guides slidably to support the cover member above said food supporting member.

4. An auxiliary oven as set forth in claim 3, wherein the food supporting member is spaced apart from the bottom of said casing and is narrower than the interior of the casing.

5. An auxiliary oven comprising a small casing open at the front, means on the upper part of the casing to suspend it in the interior of a conventional oven; a food container composed of two members cooperating to create a chamber bounded by side, front, rear, top and bottom walls; means in the upper part of the casing to support one of the members for sliding movements into and out of the casing; means in the bottom of the casing to support the second of such members for movements into and out of the casing; and said second member being in the form of a slotted plate that carries the front wall of the chamber and is provided with feet to hold the plate clear of the casing.

CHARLES P. CRAWFORD.

REFERENCES CITED

The following references are of record in the file of this patent:

UNITED STATES PATENTS

| Number | Name | Date |
| --- | --- | --- |
| 434,242 | Buzzacott | Aug. 12, 1890 |
| 903,834 | Boeddener | Nov. 17, 1908 |
| 1,242,941 | Howes | Oct. 16, 1917 |
| 1,343,129 | Harrington | June 8, 1920 |
| 1,478,134 | Mitchell | Dec. 18, 1923 |
| 2,453,939 | Schneider | Nov. 16, 1948 |

FOREIGN PATENTS

| Number | Country | Date |
| --- | --- | --- |
| 6,468 | Great Britain | of 1914 |
| 482,815 | Germany | Sept. 20, 1929 |